UNITED STATES PATENT OFFICE.

JOHN SALM, OF ALBANY, NEW YORK, ASSIGNOR TO CHARLES L. A. WHITNEY, OF ALBANY, NEW YORK.

METHOD OF MAKING SOLDER.

1,326,971. Specification of Letters Patent. Patented Jan. 6, 1920.

No Drawing. Application filed August 3, 1918. Serial No. 248,143.

*To all whom it may concern:*

Be it known that I, JOHN SALM, a citizen of the United States, residing at Albany, county of Albany, State of New York, have invented a certain new and useful Improvement in Methods of Making Solder, of which the following is a full, clear, and exact description.

My invention relates to a new and useful improvement in solder and the method of making the same, and has for its object to produce a solder for use in uniting pieces of aluminum or aluminum alloy in a strong and durable manner.

Heretofore attempts have been made to produce a solder for uniting pieces of aluminum or aluminum alloy but the solder resulting therefrom has in some instances been without sufficient inherent strength; in other instances it has failed to unite sufficiently with the parts to be soldered; in other instances it has been subject to oxidation so as to rapidly deteriorate; and in other instances it has been subject to electrolysis or chemical action so as to soon become broken down. It is the object of my invention to produce a solder which largely overcomes these objections to solders heretofore made.

The following is a description of a solder embodying my invention and the manner of producing and using the same.

My solder when produced contains tin, aluminum and zinc, over 50 per cent. of the solder being tin and the zinc being in excess of the aluminum. In the specimen hereinafter particularly referred to, the tin amounts to about 75 per cent., the zinc to about 16 per cent. and the aluminum to about 8 per cent., the zinc being thus about twice as much as the aluminum.

In producing this specimen which contains the preferred proportions, I use a crucible of suitable size, preferably a graphite crucible, and first melt therein twenty-four (24) parts (by weight) of aluminum, running the heat up to about sixteen hundred degrees (1600°) Fahrenheit to thoroughly melt the same. I use the aluminum to make the alloy plastic and as a filler. It is melted first on account of its having the highest melting point of the metals used. I now add a little chlorid of sodium, one-half pound (troy weight) for each twenty-four pounds (avoirdupois) of aluminum, stirring it in at this heat (about 1600° F.). The salt acts as a fluxing agent to assist in separating the impurities to form a slag, which appears as a coating or residue on top of the metal. The salt is used to prepare the metal to receive the ingredients that are yet to be added. By its chemical action it gives color and strength to the alloy and causes the alloy to work freely. I next put in the tin, about 110 parts, by weight, which acts as the base or foundation metal for the alloy. This is put in slowly and I allow heat to decrease to about eleven hundred degrees (1100°) F. during the period in which I am introducing it. This reduction eliminates the possibility of burning the metal. I use the tin for its flexible, non-oxidizing qualities and strength, also as a binder. I now add a covering of powdered charcoal on the top of the mixture in the crucible to prevent the oxygen of the air from coming in contact therewith so as to avoid or prevent oxidation. A layer of powdered charcoal about one-half inch deep is sufficient for this purpose. I then allow the heat to gradually decrease and at the same time add the zinc, about 36 parts, by weight, until the heat has decreased to about eight hundred degrees (800°) F. I do this because the zinc will oxidize and burn with too much heat and because it will not properly alloy with the other metals at high heat. I have now produced a eutectic alloy of tin, zinc and aluminum, the melting point of which is about five hundred degrees (500°) F. I use the zinc for its hardening qualities and as a filler. I now see that the metal in the crucible is thoroughly covered with powdered charcoal and increase the heat to about fifteen hundred degrees (1500°) F. and add about four ounces (troy weight) of boracic acid or borax for each twenty-four pounds (avoirdupois) of aluminum, thoroughly stirring it in. This has an affinity for the alloy and will melt and must be worked in at this heat and acts as a flux. I then allow the heat to drop and skim the slag off the metal in the crucible, after which the alloy can be formed into bars or rods to be used for soldering purposes.

This compound when used in connection with aluminum is not subject to electrolysis to an objectionable extent. It also resists oxidation, both external and internal, and holds its color and is substantially free from chemical deterioration.

In producing the solder, portions of the zinc and aluminum oxidize or volatilize so that the proportions in the finished product differ considerably from the proportions as placed in the crucible. Placing the materials in the crucible in the proportions above stated, and treating them in the manner indicated, the product is found to contain about 75 per cent. of tin, 16 per cent. of zinc, and 8 per cent. of aluminum, the other materials placed within the crucible having either disappeared or having left but minute indications of their presence so far as can be detected by chemical analysis.

In using the above named solder on aluminum or aluminum alloy articles, the parts to be united are first heated to between five hundred degrees (500°) and seven hundred degrees (700°) F. and brushed vigorously with a wire brush or other suitable instrument that will thoroughly clean the surfaces and the pores of the parts to be united or soldered. The solder or welding stick is then applied by rubbing the same on the parts to be united, under heat, until the solder takes to or adheres to the metal. By so doing, a coating of the solder is deposited upon the parts to be united. It is a well known fact that aluminum or aluminum alloys and other metals expand under heat and that the pores of the metal enlarge. The surfaces and pores of the parts to be united having been cleaned and coated under heat, as above stated, are now brushed under heat to help the process of penetration of the solder into the pores of the metal. More composition can be added and the brushing or puddling process can be repeated several times to insure the operator that the composition has taken a deep and firm rooting in the faces of the parts to be united. With the heat maintained between five hundred degrees (500°) and seven hundred degrees (700°) F. additional solder is worked on to the parts until sufficient has been deposited to finish the work as may be required. The parts are then brought together and held in position. The solder deposited as above, together with additional solder, can now be worked with a puddling tool to fill in or mold, reinforce or build up the shape or form desired. The operator should keep puddling to the finish to prevent the formation of voids. The work can then be smoothed up with any suitable smoothing tool, which should be heated before applying, and thereafter allowed to cool under normal conditions. Care should be taken in regard to jarring or moving the work while the solder is hardening.

This alloy or composition has an affinity for metal without the use of a flux, as it contains its own flux. It will not oxidize when cool nor will it oxidize under the heat used while being applied.

As will be evident to those skilled in the art, my invention permits of various modifications without departing from the spirit thereof or the scope of the appended claims.

What I claim is:

1. The process of making aluminum solder which consists in melting aluminum, adding thereto a small quantity of salt, adding thereto a relatively large quantity of tin, meanwhile permitting the heat to decrease, covering this product with means for protecting against oxidation and adding zinc in excess of the aluminum and in considerably less quantity than the tin and forming the product into shape for use.

2. The process of making aluminum solder, which consists in melting aluminum, adding thereto a small quantity of salt, adding thereto a relatively large quantity of tin, meanwhile permitting the heat to decrease, covering this product with means for protecting against oxidation and adding zinc in excess of the aluminum and in considerably less quantity than the tin, heating the same to about fifteen hundred degrees (1500°) F. and adding a flux and forming the same into shape for use.

JOHN SALM.